(12) United States Patent
Lee

(10) Patent No.: US 8,736,738 B2
(45) Date of Patent: May 27, 2014

(54) OPTICAL LENS AND IMAGE PICK-UP APPARATUS HAVING SAME

(75) Inventor: Chun-Yu Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 7 days.

(21) Appl. No.: 13/533,987

(22) Filed: Jun. 27, 2012

(65) Prior Publication Data

US 2013/0044253 A1    Feb. 21, 2013

(30) Foreign Application Priority Data

Aug. 18, 2011    (TW) .............................. 100129496 A

(51) Int. Cl.
*H04N 5/225* (2006.01)

(52) U.S. Cl.
USPC .......................................... 348/335; 348/374

(58) Field of Classification Search
USPC ........... 348/335, 340, 373–376; 359/710, 725
See application file for complete search history.

(56) References Cited

U.S. PATENT DOCUMENTS

| | | | |
|---|---|---|---|
| 4,844,724 A * | 7/1989 | Sakai et al. .................... 65/30.13 |
| 7,054,068 B2 * | 5/2006 | Yoshida et al. ................ 359/624 |
| 7,268,335 B2 * | 9/2007 | Hiltunen ...................... 250/208.1 |
| 7,460,236 B2 * | 12/2008 | Ivarsson ........................ 356/445 |
| 7,528,880 B2 * | 5/2009 | Yamaguchi et al. ........... 348/335 |
| 7,612,946 B2 * | 11/2009 | Kweon et al. .................. 359/648 |
| 8,184,195 B2 * | 5/2012 | Duparre ......................... 348/340 |
| 2005/0162759 A1 * | 7/2005 | Lee ................. 359/819 |
| 2008/0019026 A1 * | 1/2008 | Feng et al. ..................... 359/819 |
| 2011/0164036 A1 * | 7/2011 | De Zwart et al. .............. 345/419 |
| 2013/0037695 A1 * | 2/2013 | Lee ............................ 250/208.1 |
| 2013/0038774 A1 * | 2/2013 | Lee ............................... 348/340 |

* cited by examiner

*Primary Examiner* — Timothy J Henn
(74) *Attorney, Agent, or Firm* — Novak Druce Connolly Bove + Quigg LLP

(57) ABSTRACT

A lens includes an optically effective portion and a peripheral portion. The optically effective portion is configured for converging light, and includes a first surface, a second surface, and a third surface interconnecting the first and second surfaces. The first and second surfaces are plane surfaces, and are parallel with each other. The third surface is a convex surface. The peripheral portion is arranged surrounding the optically effective portion. The peripheral portion has a fourth surface substantially perpendicular to the first and second surfaces. The third surface is convex away from the fourth surface. The first surface intersects the fourth surface at a first side. The second surface intersects the fourth surface at a second side. The first and second sides have a same length. The length is greater than a distance between the first side and the second side.

10 Claims, 6 Drawing Sheets

OPTICAL LENS AND IMAGE PICK-UP APPARATUS HAVING SAME

BACKGROUND

1. Technical Field

The present disclosure relates generally to an optical lens and an image pick-up apparatus having the optical lens.

2. Description of Related Art

Image pick-up apparatuses are used in a variety of consumer electronic devices, such as notebook computers, personal digital assistants (PDAs), and cellular telephones. An image pick-up apparatus includes a lens module, a base plate, and an image sensor mounted on the base plate. The lens module includes a lens barrel and a number of lenses received in the lens barrel. The image sensor has a top surface facing the lens module and a rectangular optically effective region defined in the top surface. The base plate is fixed to an end of the lens barrel, and defines a through hole for exposing the optically effective region of the image sensor and allowing light to be transmitted from the lens module onto the optically effective region of the image sensor. The top surface of the image sensor includes a round illuminable area. Light transmitted through the lens module is projected onto the illuminable area. The optically effective region of the image sensor is entirely within the illuminable area. The light striking the illuminable area except for the optically effective region is useless, and even though such light is useless, it may have an adverse consequence in that such light may be reflected by an inner wall of the base plate adjacent to the through hole, giving rise to glare during image capture.

Therefore, there is a need for an optical lens and an image pick-up apparatus having the same to overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
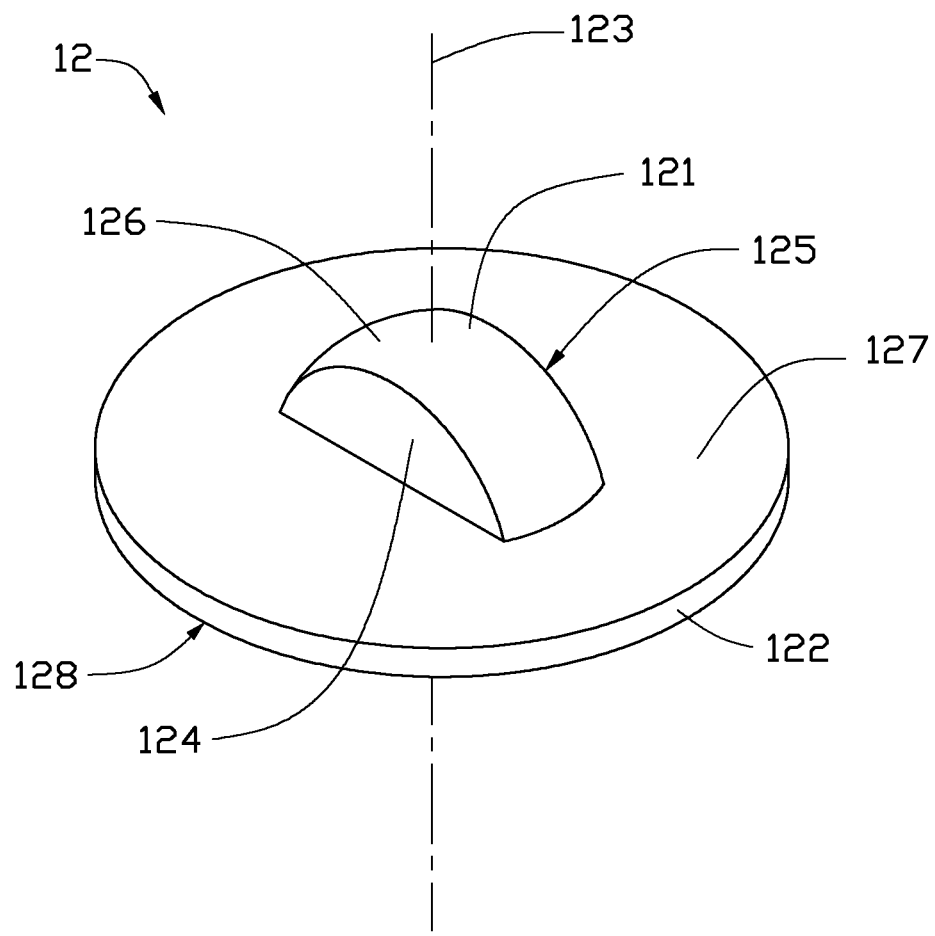
FIG. 1 is an isometric view of an optical lens according to a first exemplary embodiment.
Figure 2:
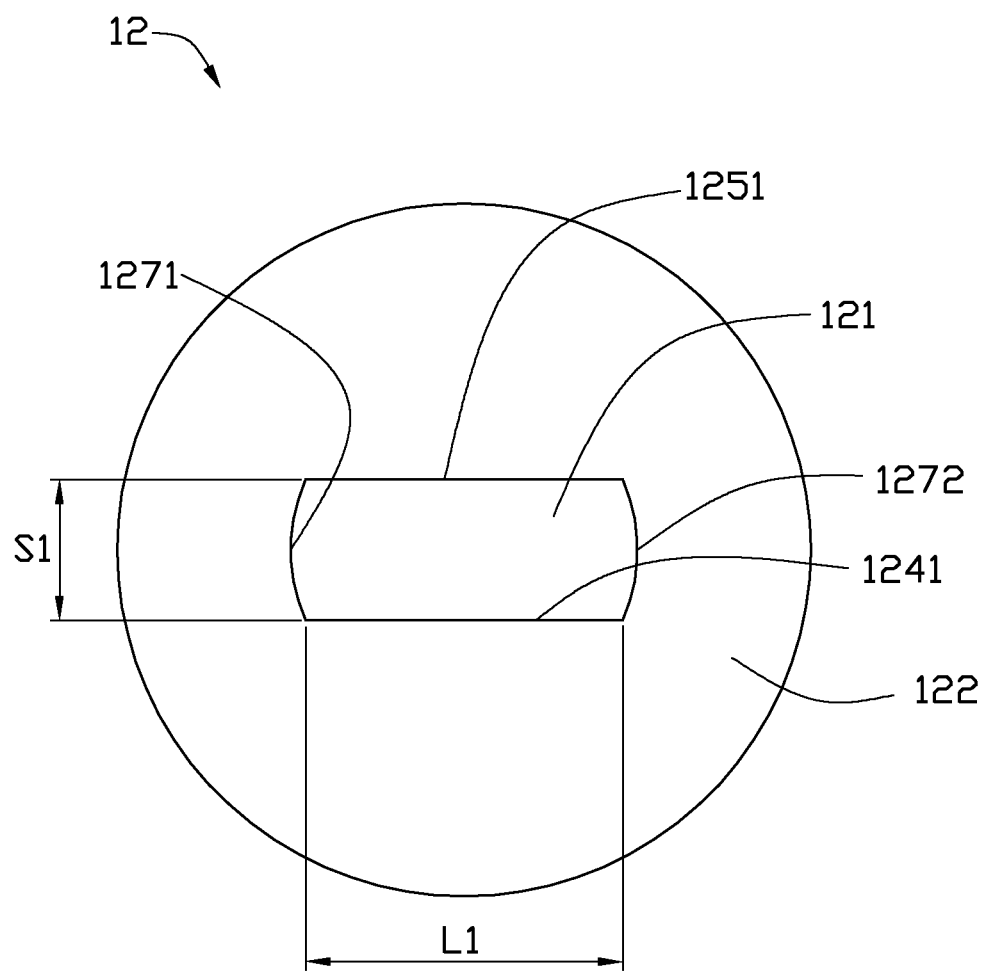
FIG. 2 is a front view of the optical lens of FIG. 1.

Referring to FIGS. 1 to 2, an optical lens 12 according to a first exemplary embodiment includes an optically effective portion 121 and a peripheral portion 122 surrounding the optically effective portion 121. The optical lens 12 is comprised of plastic or glass. The optically effective portion 121 is light pervious, and converges light passing therethrough. The peripheral portion 122 can be light-pervious or light-proof.

The optically effective portion 121 has a first surface 124, a second surface 125, and a third surface 126 interconnected between the first surface 124 and the second surface 125. The first surface 124 and the second surface 125 are plane surfaces, and are parallel with each other. The third surface 126 is a convex, spherical surface.

The peripheral portion 122 is integrally formed with the optically effective portion 121. That is, the optical lens 12 is a single body of material comprising the optically effective portion 121 and the peripheral portion 122. The peripheral portion 122 is disk-like, and has a round outline in a front view. The peripheral portion 122 has a fourth surface 127, and an opposite fifth surface 128 parallel with the fourth surface 127. The optically effective portion 121 protrudes from the fourth surface 127, and is arranged at the center of the fourth surface 127. The fourth surface 127 of the peripheral portion 122 is substantially perpendicular to the first surface 124 and the second surface 125 of the optically effective portion 121. The third surface 126 is convex away from the fourth surface 127. The optical lens 12 has an optical axis 123. The optical axis 123 passes through the center of the third surface 126.

Referring to FIG. 2, an intersection between the optically effective portion 121 and the fourth surface 127 has an outline comprising a first side 1241, a second side 1271, a third side 1251 and a fourth side 1272 connected end to end. The first surface 124 intersects the fourth surface 127 at the first side 1241. The second surface 125 intersects the fourth surface 127 at the third side 1251. The third surface 126 intersects the fourth surface 126 at the second side 1271 and the fourth side 1272. The first and second sides 1241 and 1251 are straight and parallel with each other, and the third and fourth sides 1271 and 1272 are curved. The first side 1241 and the second side 1251 have a same length L1. A distance S1 between the first side 1241 and the second side 1251 is less than the length L1.

The third surface 126 can also be an aspheric surface, as long as the optical axis 123 always passes through the center of the third surface 126.

Figure 3:
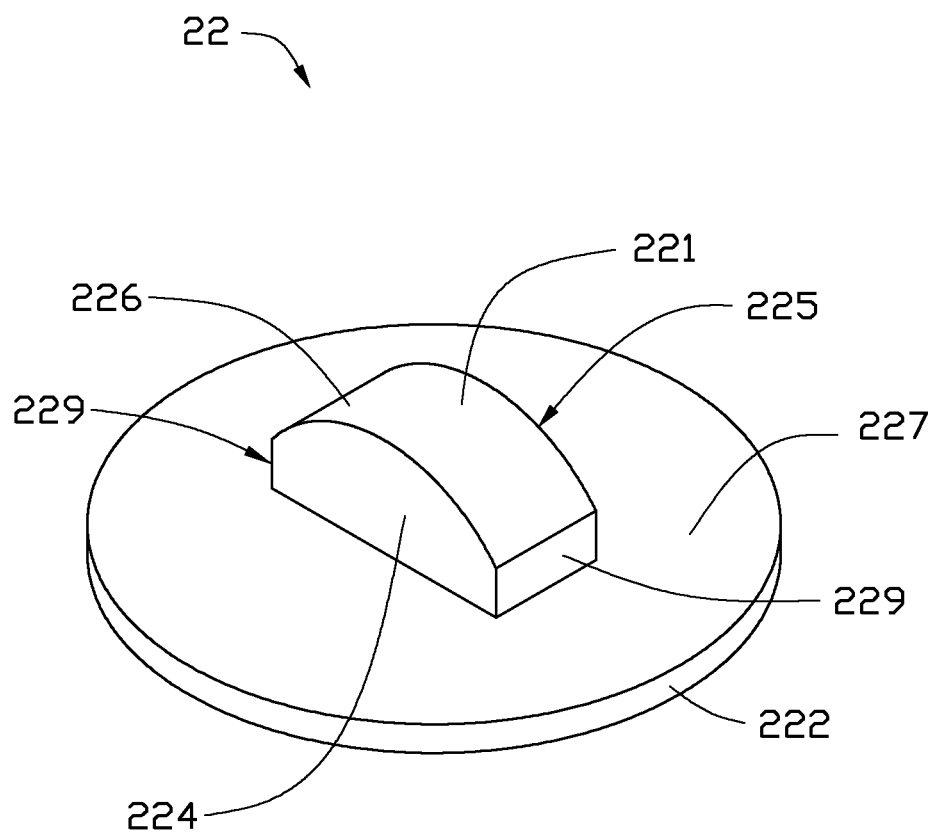
FIG. 3 is an isometric view of an optical lens according to a second exemplary embodiment.

Referring to FIG. 3, an optical lens 22 according to a second exemplary embodiment is similar to the optical lens 12, and the differences are that an optically effective portion 221 of the optical lens 22 further comprises two sixth surfaces 229 arranged between a first surface 224 and a second surface 225 of the optically effective portion 221, and between a third surface 226 of the optically effective portion 221 and a fourth surface 227 of a peripheral portion 222 of the optical lens 22. The sixth surfaces 229 are substantially perpendicular to the fourth surface 227 and to the first surface 224. Each of the sixth surfaces 229 is interconnected between the first surface 224 and the second surface 225, and extends from the third surface 226 to the fourth surface 227.

Figure 4:
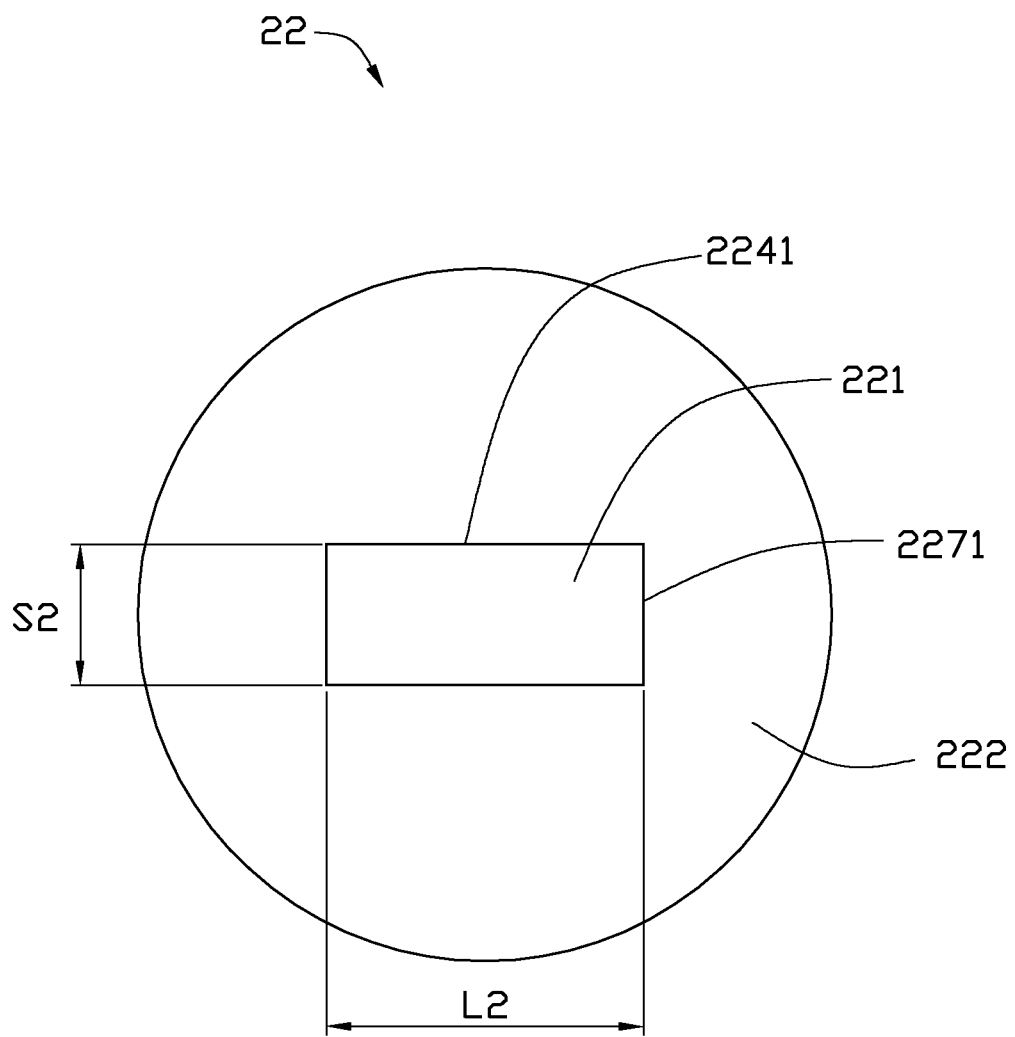
FIG. 4 is a front view of the optical lens of FIG. 3.

Referring to FIG. 4, an intersection between the optically effective portion 221 and the fourth surface 227 has an rectangular outline comprising two parallel long sides 2241 and two short sides 2271. The first surface 224 and the second surface 225 intersect the fourth surface 227 at the two long sides 2241. The two sixth surfaces 229 intersect the fourth surface 127 at the two short sides 2271. Each of the long sides 2241 has a length L2, and each of the short sides 2271 has a length S1. The ratio of L2 to S2 is substantially equal to the ratio of L1 to S1.

Figure 5:
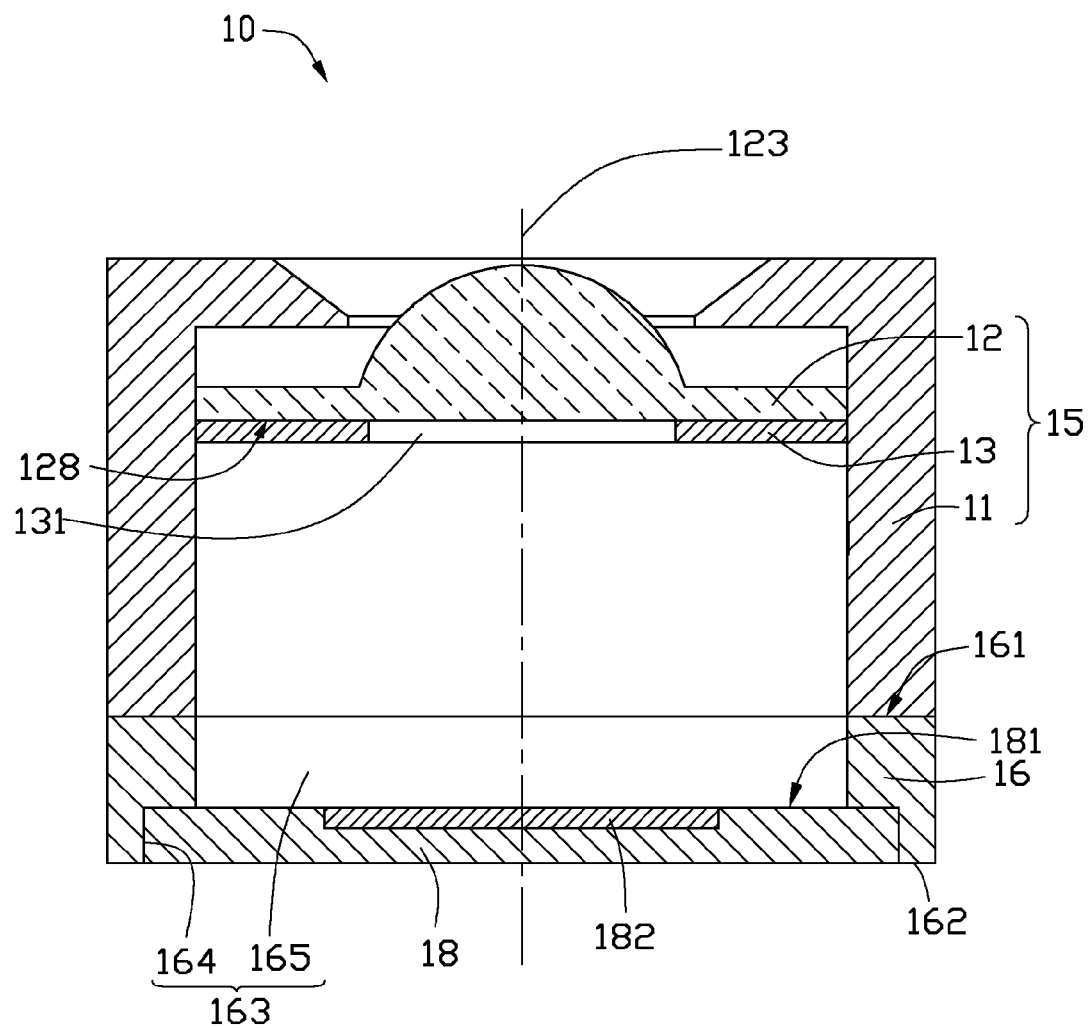
FIG. 5 is a sectional view of an image pick-up apparatus according to a second exemplary embodiment, comprising the optical lens of FIG. 1 and an image sensor.

Referring to FIG. 5, an image pick-up apparatus 10 according to a third exemplary embodiment includes a lens module 15, a base plate 16 and an image sensor 18. The lens module 15 includes a lens barrel 11, the optical lens 12 and a light shielding plate 13.

The optical lens 12 and the light shielding plate 13 are received in the lens barrel 11. The light shielding plate 13 is arranged adjacent to the fifth surface 128 of the optical lens 12. The light shielding plate 13 defines a rectangular through hole 131 at the center thereof for allowing the passage of light. The through hole 131 has a length-to-width ratio the same as the ratio of the length L1 to the width S1 of the optical lens 12. The through hole 131 is aligned with the optically effective portion 121, and the long sides (not labeled) of the through hole 131 are parallel with the first and second sides 1241 and 1251 of the optical lens 12. The long sides of the through hole 131 have a length substantially equal to or slightly shorter than the first and second sides 1241 and 1251 of the optical lens 12.

The base plate 16 has a sixth surface 161, an opposite seventh surface 162, and a through hole 163 passing through the sixth surface 161 and the seventh surface 162. The through hole 163 includes a first hole portion 164, and a second hole portion 165 in communication with the first hole. The first hole portion 164 is adjacent to the sixth surface 161, and the second hole portion 165 is adjacent to the seventh surface 162. The first hole portion 164 and the second hole portion 165 each have a rectangular cross section and are aligned with each other. The second hole portion 165 is wider than the first hole portion 164. In this embodiment, the base plate 16 is comprised of ceramic material.

The image sensor 18 is fixed in the second hole portion 165 of the base plate 16. In this embodiment, the image sensor 18 is fixed to the base plate 16 by soldering. The image sensor 18 has a top surface 181 facing the lens module 15 and an optically effective region 182 which is rectangular defined in the top surface 181. The optically effective region 182 is aligned with the through hole 131 and the optically effective portion 121 of the optical lens 12 about the optical axis 123. The optically effective region 182 is configured for capturing images.

Figure 6:
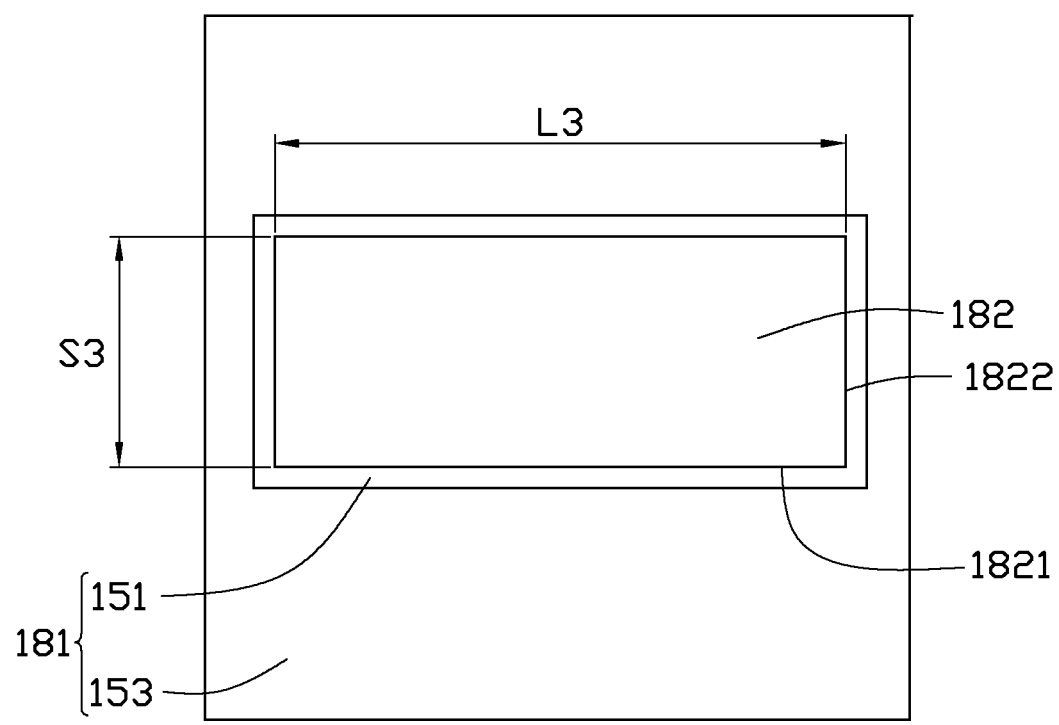
FIG. 6 shows a relationship between an illuminable area onto which light transmitted through the optical lens is projected and an optically effective region of the image sensor in FIG. 5.

Referring to FIG. 6, the optically effective region 182 has two parallel long sides 1821 and two short sides 1822. The long sides 1821 are parallel with the first and second sides 1241 and 1251 of the optically effective portion 121 of the optical lens 12. The long sides 1821 each have a length L3, and the short sides 1822 each have a length S3. The ratio of the length L3 to the length S3 is substantially equal to the ratio of the length L1 to the distance S1 of the optical lens 12. The top surface 181 of the image sensor 18 includes an illuminable area 151 and a non-illuminable area 153. Light passing through the optical lens 12 of the lens module 15 and the through hole 131 of the light shielding plate 13 is projected onto the illuminable area 151. The illuminable area 151 is rectangular with a length-to-width ratio substantially equal to the ratio of the length L1 to the distance S1, and is slightly larger than the optically effective portion 121. A projection of the optically effective region 182 of the image sensor 18 on the top surface 181 is entirely within the illuminable area 151 because the optically effective region 182 and the through hole 131 are aligned with the optically effective portion 121. The illuminable area 151 can also have an area substantially equal to the optically effective region 182 and which coincides with the optically effective region 182.

The illuminable area 151 is rectangular and is slightly larger than the optically effective region 182 in this embodiment. The optically effective region 182 of the image sensor 18 is entirely within the illuminable area 151. The illuminable area 151 is surrounded by the non-illuminable area 153. In this situation, no light passing through the lens module 15 can strike the inner surface of the base 16 and glare, in the image pick-up apparatus 10, is thereby eliminated or at least kept to a minimum.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical lens, comprising:
    an optically effective portion for converging light passing therethrough, the optically effective portion comprising a first surface, a second surface and a third surface interconnected between the first and second surfaces, the first surface and the second surfaces being plane surfaces and parallel with each other, the third surface being a convex surface; and
    a peripheral portion surrounding the optically effective portion, the peripheral portion having a fourth surface substantially perpendicular to the first and second surfaces, the third surface being convex away from the fourth surface, the first surface intersecting the fourth surface at a first side, the second surface intersecting the fourth surface at a second side, the first side and the second side having a same length, the length being greater than a distance between the first side and the second side, wherein the third surface intersects the fourth surface at a third side and a fourth side, the third and fourth sides being outwardly curved, the first side, the third side, the second side and the fourth side connected end to end.

2. The optical lens of claim 1, wherein the optically effective portion further comprises two opposite fifth surfaces interconnected between the first surface and second surface, the fifth surfaces extending from the fourth surface to the third surface, the fifth surfaces substantially perpendicular to the first and second surfaces and the fourth surface, the fifth surfaces intersecting the fourth surface at a third side and a fourth side, the first side, the third side, the second side and the fourth side connected end to end, thereby forming a rectangle.

3. The optical lens of claim 1, wherein the optically effective portion further comprises two opposite fifth surfaces interconnected between the first surface and second surface, the fifth surfaces extending from the fourth surface to the third surface, the fifth surfaces substantially perpendicular to the first and second surfaces and the fourth surface, the fifth surfaces intersecting the fourth surface at a third side and a fourth side, the first side, the third side, the second side and the fourth side connected end to end, thereby forming a rectangle.

4. The optical lens of claim 2, wherein the third surface is a spherical or aspheric surface.

5. An image pick-up apparatus, comprising:
    a lens module comprising:
        a lens barrel;
        an optical lens received in the lens barrel, the optical lens comprising:
            an optically effective portion for converging light passing therethrough, the optically effective portion comprising a first surface, a second surface and a third surface interconnected between the first and second surfaces, the first surface and the second surfaces being plane surfaces and parallel with each other, the third surface being a convex surface, the optically effective portion having an optical axis; and a peripheral portion surrounding the optically effective portion, the peripheral portion having a fourth surface substantially perpendicular to the first and second surfaces, the third surface being convex away from the fourth surface, the first surface intersecting the fourth surface at a first side, the second surface intersecting the fourth surface at a second side, the first side and the second side having a same length L1, the length L1 being greater than a distance S1 between the first side and the second side; and a light shielding plate received in the lens barrel adjacent the optical lens, the light shielding plate defining a first through hole aligned with the optically effective portion, the first through hole being rectangular and aligned with the optically effective portion; the length-to-width ratio of the through hole being substantially equal to the ratio of the length to the distance; and an image sensor having an exposed top surface facing the lens module, the top surface including a rectangular optically effective region configured for capturing images, the optically effective region having two parallel first long sides parallel with the first side and two parallel first short sides, and the optically effective region being aligned with the optically effective portion, the ratio of a distance between the first short sides to a distance between the first long sides being substantially equal to the ratio of the length L1 to the distance S1, the top surface comprising an illuminable region on which light passing through the lens module is projected and a non-illuminable region with no light transmitted through the lens module being projected thereon, the illuminable region having two parallel second long sides parallel with the first long sides and two parallel second short sides parallel with the first shorts sides, a projection of the optically effective region on the top surface being entirely within the illuminable region.

6. The image pick-up apparatus of claim 5, wherein the second through hole comprises a first hole portion, and a second hole portion in communication with the first hole portion, the first hole portion being adjacent to the fifth surface and the second hole being adjacent to the sixth surface, the first and second holes each having a rectangular cross section and being aligned with each other, the second hole being wider than the first hole, the image sensor being fixed in the second hole.

7. The image pick-up apparatus of claim 5, wherein the third surface is a spherical or aspheric surface.

8. The image pick-up apparatus of claim 5, wherein the third surface intersects the fourth surface at a third side and a fourth side, the third and fourth sides being outwardly curved, the first side, the third side, the second side and the fourth side connected end to end.

9. The image pick-up apparatus of claim 5, wherein the optically effective portion further comprises two opposite fifth surfaces interconnected between the first surface and second surface, the fifth surfaces extending from the fourth surface to the third surface, the fifth surfaces substantially perpendicular to the first and second surfaces and the fourth surface, the fifth surfaces intersecting the fourth surface at a third side and a fourth side, the first side, the third side, the second side and the fourth side connected end to end, thereby forming a rectangle.

10. An optical lens, comprising:

an optically effective portion for converging light passing therethrough, the optically effective portion comprising a first surface, a second surface and a third surface interconnected between the first and second surfaces, the first surface and the second surfaces being plane surfaces and parallel with each other, the third surface being a convex surface; and a peripheral portion surrounding the optically effective portion, the peripheral portion having a fourth surface substantially perpendicular to the first and second surfaces, the peripheral portion having a round outline when viewed from a direction facing the fourth surface, the third surface being convex away from the fourth surface, the first surface intersecting the fourth surface at a first side, the second surface intersecting the fourth surface at a second side, the first side and the second side having a same length, the length being greater than a distance between the first side and the second side, wherein the third surface intersects the fourth surface at a third side and a fourth side, the third and fourth sides being outwardly curved, the first side, the third side, the second side and the fourth side connected end to end.

* * * * *